(No Model.) 2 Sheets—Sheet 1.

J. E. PITRAT.
WEIGHING AND PRICE SCALE.

No. 314,717. Patented Mar. 31, 1885.

Witnesses:
Sam'l R. Turner
O. M. Kramer

Inventor:
Julius E. Pitrat
By R. S. & A. P. Lacey, Att'ys (No Model.) 2 Sheets—Sheet 2.

J. E. PITRAT.
WEIGHING AND PRICE SCALE.

No. 314,717. Patented Mar. 31, 1885.

Witnesses:
Sam'l R. Turner
O. M. Kramer

Inventor
Julius E. Pitrat
By R. S. & A. T. Lacey
Attys.

UNITED STATES PATENT OFFICE.

JULIUS E. PITRAT, OF GALLIPOLIS, OHIO.

WEIGHING AND PRICE SCALE.

SPECIFICATION forming part of Letters Patent No. 314,717, dated March 31, 1885.

Application filed January 24, 1885. (No model.)

*To all whom it may concern:*

Be it known that I, JULIUS E. PITRAT, a citizen of the United States, residing at Gallipolis, in the county of Gallia and State of Ohio, have invented certain new and useful Improvements in Weighing and Price Scales; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention is an improvement in scales, and has for its object to provide a scale in which the total price of merchandise in quantity may be quickly and accurately determined, the price per pound being given. It has for further objects to enable the automatic demonstration of other problems in quantity, weight, and price, which will be hereinafter more fully described, and pointed out in the claims.

Figure 1:
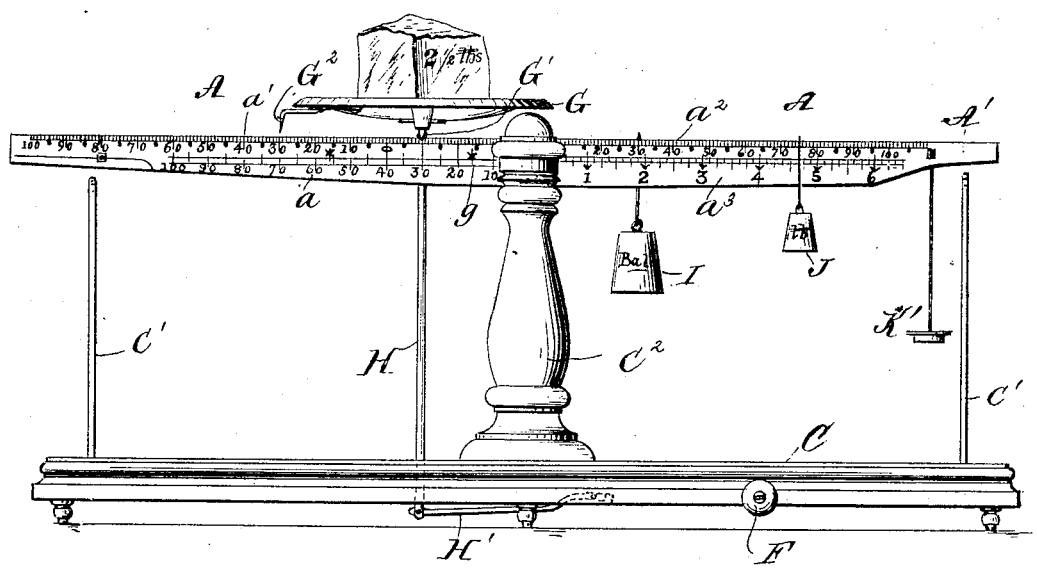
Figure 2:
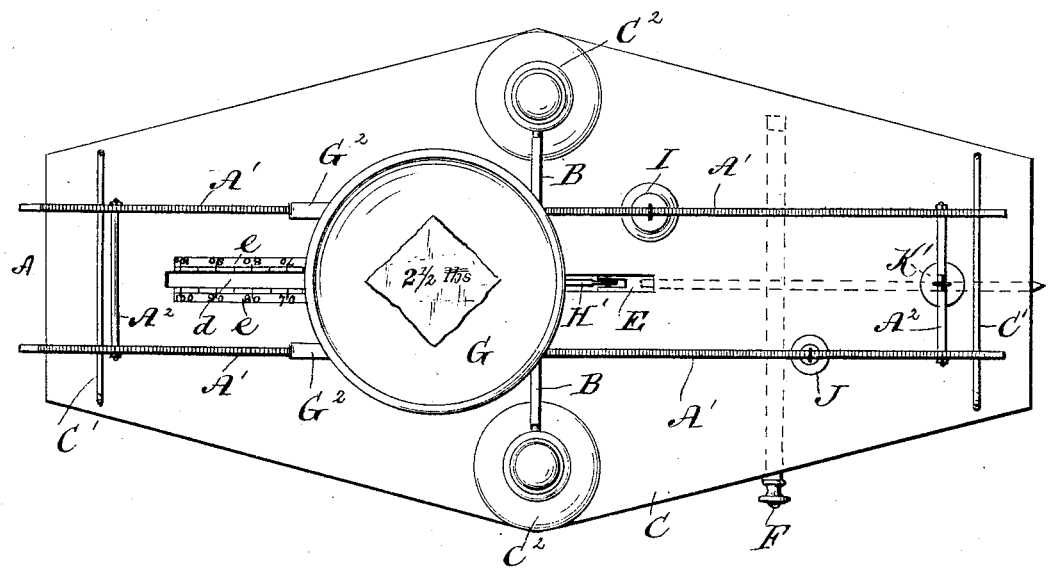
Figure 3:
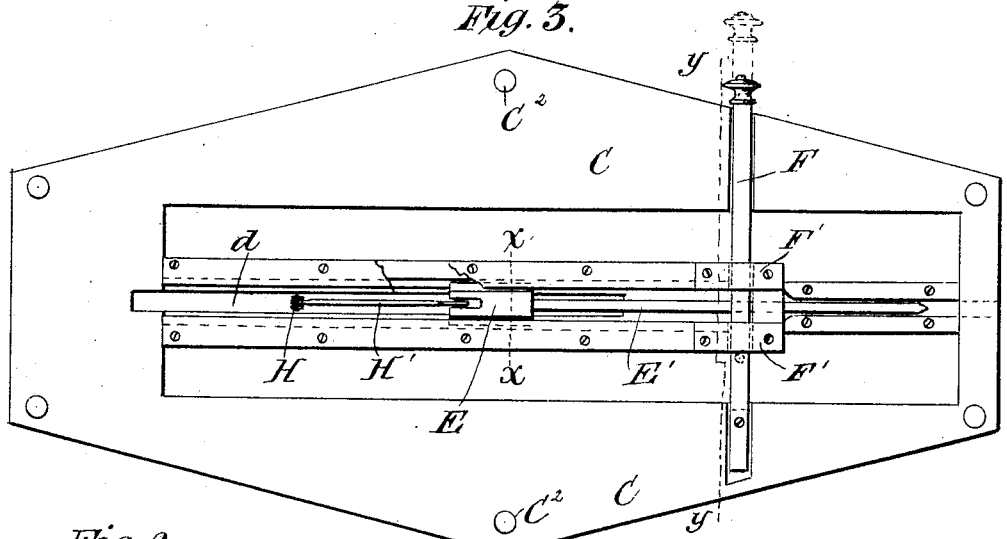
Figure 4:
Figure 5:
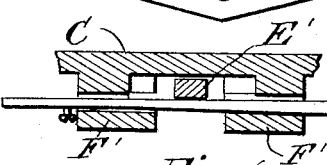
Figure 6:
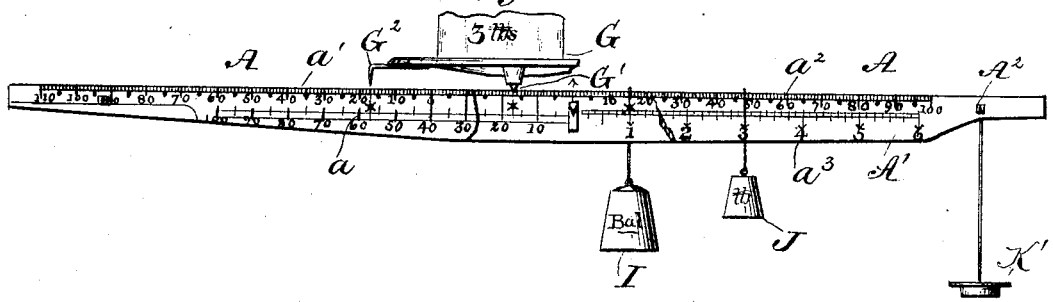
Figure 7:
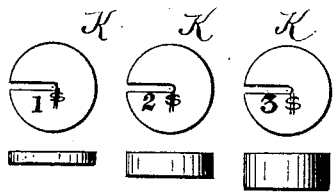
Figure 8:
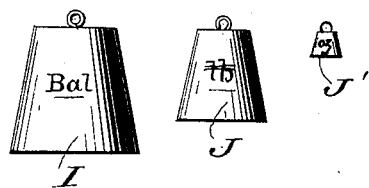

In the drawings, Figure 1 is a side view, Fig. 2 a top plan view, and Fig. 3 a bottom plan view, of my scale. Fig. 4 is a detached section on line $x\ x$, Fig. 3. Fig. 5 is a detached section on line $y\ y$, Fig. 3. Fig. 6 is a detail side view, partly broken away, of the lever. Fig. 7 represents the dollar-weights, and Fig. 8 the balance and weighing weights, all of which will be described.

The lever A is formed, preferably, of two parallel beams, A' A', graduated alike, and usually connected together at their ends by rods $A^2 A^2$, one of which serves to receive the dollar or overbalance weights. This lever is provided midway between its ends with pivots B. usually knife-edged, and which are supported in uprights $C^2$, or may be suspended from above, as desired.

The lever is graduated as follows: Its arm to the left of its support is provided with two sets of graduations, a lower or true graduation, $a$, and an upper or indicating graduation, $a'$. The right arm of the lever is also provided with two graduations, the upper one, $a^2$, corresponding to that of the true graduation $a$ of the left arm, with a second graduation, $a^3$, for use in ordinary weighing, as will be described.

In carrying out my invention I provide a base, C, on which at its ends I mount stops C', to limit the downward movement of the free ends of the lever. Uprights $C^2 C^2$, placed midway between the stops C', serve as preferable supports for the lever. This base is provided with guides D D for a cross-head, E, which is adjustable or movable longitudinally along the base, for the purpose presently described. These guides D may be mounted on the base and the cross-head be secured in any point of adjustment by a set-screw turned through it against the base, or other desired clamping expedient may be employed. I prefer, however, in practice to slot the base at $d$, and arrange the guides on opposite sides of and below such slot, as shown most clearly in Figs. 2, 3, and 4. A rod, E', is attached at one end to and extended rearwardly from the cross-head. A wedge-bar, F, is movable through a keeper or keepers, F', arranged on one or both sides of the bar E'. The bar F is tapered, as shown most clearly in Fig. 5, and moves at one side against the bar E', binding the latter firmly against the base or other support, and clamping it and the cross-head in its set position. When the cross-head is arranged above the base, the guides D and the bar E are similarly disposed. The scale pan or scoop G is provided with bearing-points G', which rest on the lever, which is usually milled or nicked on its upper edge or edges, the nicks corresponding to the graduating-marks, as will be understood. This pan is also provided with indicator hands or pointers $G^2$, which extend from its edge and register with the marks of the indicating-graduations.

In operation it will be seen that the pan covers the bearings G' in the lever, so that the arrangement of such points on the lever cannot be seen without stooping. The relative graduations $a'$ are arranged in advance of those $a$ a distance equal that between the bearings G' and the points $G^2$, so that the points $G^2$ indicate on graduations $a'$ the point on which the scale-pan rests on the true graduation $a$. The scale-pan is provided with a depending rod, H, which is connected pivotally to one end of a rod, H', the opposite end of which is pivoted to the cross-head E, as will be understood from Figs. 1 and 3. The object of these rods H H', cross-head, &c., is to preserve the scale-pan in its true horizontal position in its various adjustments on the lever A, and the cross-head is adjusted with the pan, so that the rod H may at all times be vertical.

To insure the accurate arrangement of the parts H H' E, I graduate the base at $e$, adjacent the path of the cross-head. This graduation corresponds in arrangement with and is similar to the true graduation $a$ of the left arm of the lever. By this graduation when the pan is set on any point of the lever the rod H may be adjusted opposite a corresponding point of the graduation $e$.

The operation of the scales may be best described by illustration of their use. Suppose, for instance, the article in the scale-pan in Figs. 1 and 2 to be butter worth thirty cents per pound and its weight to be unknown. The scale-pan is set to rest on the thirty-cent notch of the left arm of the lever. The balance-weight I is set on the right arm of the lever at 30 to balance the pan. Now, by adjusting the bob-weight J outward along the right arm of the lever it will balance the pan and contents when the price is reached, which, as shown is 75, indicating the price of the pan's contents to be seventy-five cents. If, on the other hand, it is desired to weigh out seventy-five cents' worth of thirty-cent butter, the reverse of the above operation will be carried out. The bob-weight will be placed at 75, the pan at 30, and the balance-weight at 30, and butter will be supplied to the pan until it balances the bob-weight. The same results may be obtained when it is desired to obtain a quantity of a value less than one pound—as, for instance, thirty-three cents' worth of tea rated at seventy-five cents per pound.

If the merchandise be of comparatively high value and selling by the ounce, the ounce-bob J' may be used instead of bob J. Again, if the prices go above one dollar, the proper weight, K, may be applied to the carrier K', suspended from the rod A² of the weight-arm of the lever.

It is preferred to employ the two beams A' A', because thereby a firmer support is provided for the pan, and the balance-weight I is out of the way of bob J and cannot interfere with the manipulation thereof, because the bob J may by such construction be supported on one and the balance-weight on the other beam A'. It is manifest, however, that the lever may be constructed of a single beam.

Where it is desired to weigh by pounds, &c., in the usual manner, the scale may be set back to the point indicated by the star $g$, Fig. 1, and the weight I properly set on the other arm of the lever, when by adjusting bob J with reference to graduations $a^3$, any number of pounds desired may be weighed off, as will be understood from Fig. 6.

In the foregoing description I have, to avoid confusion, confined myself to the use of a scale graduated in cents. Nevertheless, it is obvious that the beam might be subdivided into halves and quarters of the degrees shown, so that the mechanical computation may be effected just as correctly and with the further advantage of affording the computation of numbers involving fractions.

Having thus described my invention, what I claim, and desire to secure by Letters Patent, is—

1. The combination, in a scale, of the lever having a true and indicating series of graduations, and the scale-pan having supports and pointers, substantially as set forth.

2. In a scale, a lever pivotally supported between its ends, and provided on one side of its support with true graduations $a$ and indicating-graduations $a'$, and on the other side of its support with graduations $a^2$, corresponding to graduations $a$, and with graduations $a^3$, substantially as set forth.

3. The combination of the base, the lever, the pan having a depending rod, H, the movable cross-head E, means for clamping such cross-head in position, and a rod, H', connecting the rod or bar H with the cross-head, substantially as set forth.

4. The combination, with the lever, the pan having depending rod H, and the base having a keeper or keepers, F', and guides D, of the cross-head having a rod, E, the rod H', connecting the rod H and cross-head, and the wedge-bar F, substantially as set forth.

5. In a computing-scale, a lever pivotally supported between its ends and provided on one end with a true and an indicating series of graduations, and on its other end with a graduation corresponding to the true series, substantially as set forth.

6. The combination of a graduated lever, a support having a graduation corresponding to that of the lever, and a scale-pan supported on the lever and provided with a rod registering with the graduation on the support, substantially as set forth.

In testimony whereof I affix my signature in presence of two witnesses.

JULIUS E. PITRAT.

Witnesses:
A. F. MOORE,
LOUIS BAER.